United States Patent [19]

Lange

[11] 4,295,719
[45] Oct. 20, 1981

[54] BATTERY CONSERVATION BY CONTROL OF THE CHARGING CIRCUIT FOR A BUILT-IN ELECTRONIC FLASH

[75] Inventor: Karl H. Lange, Bünde, Fed. Rep. of Germany

[73] Assignee: Balda-Werke, Bünde, Fed. Rep. of Germany

[21] Appl. No.: 115,191

[22] Filed: Jan. 25, 1980

[51] Int. Cl.³ .......................... G03B 7/08; G03B 15/05
[52] U.S. Cl. ...................................... 354/50; 354/133; 354/145; 354/266
[58] Field of Search ...................... 354/50, 48, 29, 43, 354/266, 253, 251, 235, 145, 133; 353/91

[56] References Cited

U.S. PATENT DOCUMENTS

| | | |
|---|---|---|
| 3,645,189 | 2/1972 | Rentschler ............................ 354/50 |
| 3,833,915 | 9/1974 | Tanaka ................................ 354/50 |

Primary Examiner—L. T. Hix
Assistant Examiner—Stafford D. Schreyer
Attorney, Agent, or Firm—Howard I. Schuldenfrei

[57] ABSTRACT

A camera system has a self-contained flash unit where the supply of current from a battery to the flash unit charging capacitor is discontinued immediately after the level of charge on the capacitor reaches a predetermined full charge level and charging of the capacitor is controlled as a function of existing light conditions. The shutter release member is movable from a rest position through an intermediate position to a fully depressed position. A pivotally mounted holder member which is movable in response to the movement of the shutter release member carries an electromagnet and a pivotally mounted magnet armature which moves into and out of contact with the electromagnet in response to the energization and deenergization of the electromagnet to latch and release the shutter.

4 Claims, 4 Drawing Figures

BATTERY CONSERVATION BY CONTROL OF THE CHARGING CIRCUIT FOR A BUILT-IN ELECTRONIC FLASH

BACKGROUND OF THE INVENTION

The present invention relates generally to a camera with a self-contained electrical flash unit and shutter release and in particular to a camera of the character described which has a high energy efficiency.

Conventionally, cameras having a self-contained flash unit are provided with manually operable ON-OFF power switch for selectively providing electrical power from an electrical battery mounted in the camera housing to power the flash unit. Such conventional cameras are provided with a flash firing capacitor for storing electrical charge, which, upon actuation of the shutter release, is applied to the flash lamp to create the required burst of light to illuminate the target being photographed. When it is desired to operate the flash unit, the above-mentioned power switch is turned ON whereby electrical current flows from the battery to the firing capacitor to charge the latter to the required charge level. After the stored electrical charge on the firing capacitor has been applied to the flash lamp, the capacitor charge is substantially depleted and the electrical circuitry immediately causes the battery to recharge the firing capacitor in readiness for a subsequent operation of the flash lamp. Such recharging takes place automatically, i.e. even if no further use of the flash lamp is contemplated thereby causing unnecessary power drain on the battery and resulting in reduction of battery life and waste of energy.

Furthermore, in such conventional cameras in which the firing capacitor is automatically recharged immediately after discharge, the user may put the camera in storage forgetting to disconnect the flash unit from the battery. In such cases, the prolonged power drain on the battery will cause the latter to discharge completely. Such complete discharge of the battery will render the same useless and will require replacement thereof. In the case of rechargeable batteries significant replacements cost causes unnecessary and substantial additional expense.

Accordingly, the present invention provides a camera having a self-contained electrical flash unit which avoids the above-described disadvantages of the prior art. Also, the present invention provides a camera having a self-contained electrical flash unit which is highly efficient in the utilization of electrical battery energy.

Furthermore, the present invention provides a camera of the character described in which operation of the flash is controlled by the camera shutter release as a function of existing ambient light conditions, and the supply of current from the battery to the flash capacitor is discontinued immediately after the charge on the capacitor reaches a predetermined level of charge.

The present invention also provides a camera system of the character described in which operation of the flash and camera by the user is greatly simplified and reduced and wherein actuation of the flash is enabled by means of the shutter release member as a function of existing light conditions. When the flash unit reaches a predetermined charge level it is automatically disconnected from the power source and operation of the shutter release member cause either the shutter itself to be released or the charging of the flash unit to take place.

SUMMARY OF THE INVENTION

Generally speaking, in accordance with the present invention, there is provided a photographic camera system having a shutter and a flash unit for providing momentary artificial illumination of the photographic subject including means adaptable for connection of the camera system to a D.C. power source, and a shutter release member movable from a rest position through an intermediate position to a fully depressed position. Also provided is a pivotally mounted holder member mounting an electromagnet which is movable in response to the aforesaid movement of the shutter release member from a rest position through an intermediate position to a fully extended position, respectively; an armature pivotally mounted on the holder member, operative to move into first and second positions into and out of contact with the elctromagnet in response to the energization and deenergization of the electromagnet, respectively, and latching means for latching and releasing the shutter in response to the movement of the armature into and out of contact with the electromagnet whereby when the holder member is in the intermediate position and the armature is in the second position the shutter is released.

In another feature of the present invention, the position of the armature is varied in accordance with the level of light on the photographic subject.

In a further feature of the present invention the electromagnet and armature are locked in contact with each other in the ON position until the charge on the flash unit reaches a predetermined level and thereafter the armature is moved out of contact with the electromagnet by the action of a return spring.

In yet another feature of the present invention the armature will under all circumstances move out of contact with the electromagnet when the charge on the flash unit reaches a predetermined level.

Still other objects and advantages of the invention will in part be obvious and will in part become apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE INVENTION

Figure 1:
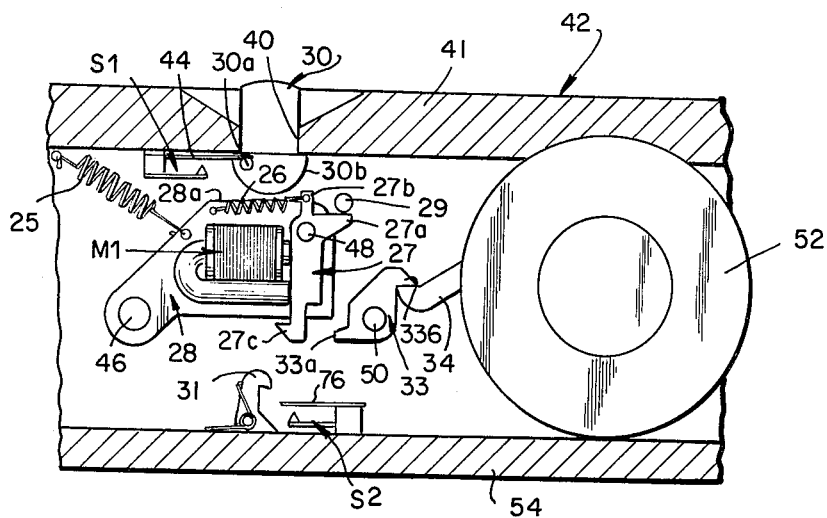
FIG. 1 is a fragmentary sectional view of a camera in accordance with the present invention showing the condition thereof with the shutter release button in a first or rest position.
Figure 2:
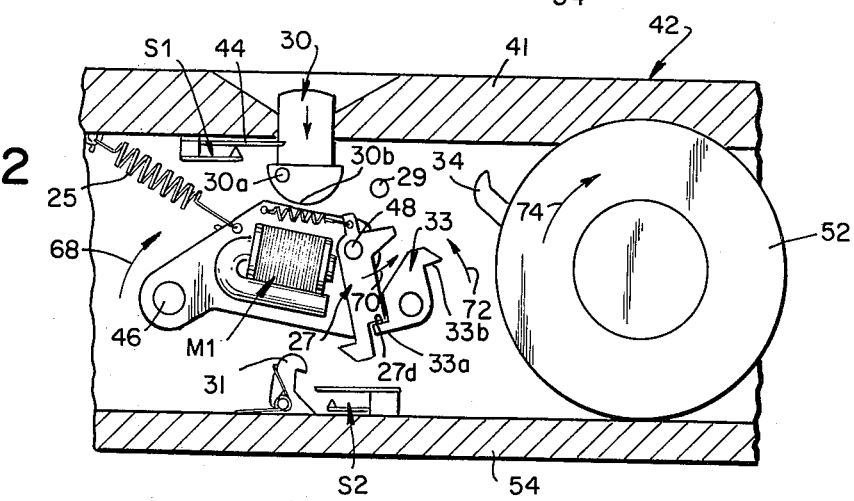
FIG. 2 is a sectional view similar to that of FIG. 1 showing the condition of the camera with the shutter release button in a second or intermediately depressed condition.
Figure 3:
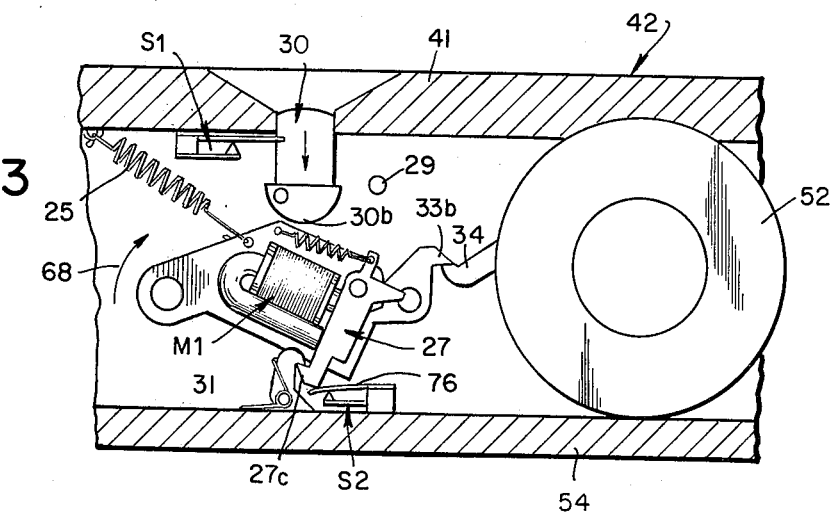
FIG. 3 is a sectional view similar to that of FIG. 2 showing the condition of the camera with the shutter release button in a third or fully depressed condition while the shutter remains unreleased.

Referring now to the drawings, the embodiment depicted in FIGS. 1-3 includes a manually depressable cylindrical shutter release button 30 slidably movable in a slot 40 formed in the top wall 41 of camera housing 42 between a first rest position depicted in FIG. 1, through a second intermediate position shown in FIG. 2, to a third limit position depicted in FIG. 3.

Pivotally mounted in housing 42 on pivot 46 is a holder 28 carrying an electromagnet M1, which is normally biased in the rest position of FIG. 1 by the restraining force of holder return spring 25. Shutter release button 30 is provided with an enlarged spherical head portion 30b for camming engagement with the smooth linear upper wall 28a of holder 28. A return pin 30a extending transversely from head 30b forces the movable contact arms 44 and 45 of normally closed switches S1 and S4 upwardly for maintaining switches S1 and S4 open when release button 30 is in the rest position of FIG. 1. Only switch S1 is visible in FIGS. 1-3.

Pivotally mounted at pivot 48 on holder 28 is a magnet armature 27 which is magnetically acted upon by electromagnet M1, when the latter is energized. Also acting upon armature 27 is a tension return spring 26 having one end thereof anchored to holder 28 and the other end thereof fixedly secured to the upper arm 27b of armature 27. Armature 27 is also provided with a nose portion 27a which bears against stop pin 29 to limit upward movement of holder 28 when armature 27 is attracted to electromagnet M1. A tooth extension portion 27c extending from the lower end of armature 27 limits the downward movement of holder 28.

Pivotally mounted on pivot 50 is a pawl 33 provided with a first tooth 33b for latching engagement with the tensioning lever 34 of shutter 52 and an oppositely disposed second tooth 33a for engagement with shoulder 27b of armature 27. Mounted on the bottom wall 54 of camera housing 42 is a spring loaded holding pawl 31 which is provided with a tooth extension located in proximity to a pair of normally open spring switches S2 and S3 mounted side by side on bottom wall 54, only switch S2 being visible in FIGS. 1-3.

Figure 4:
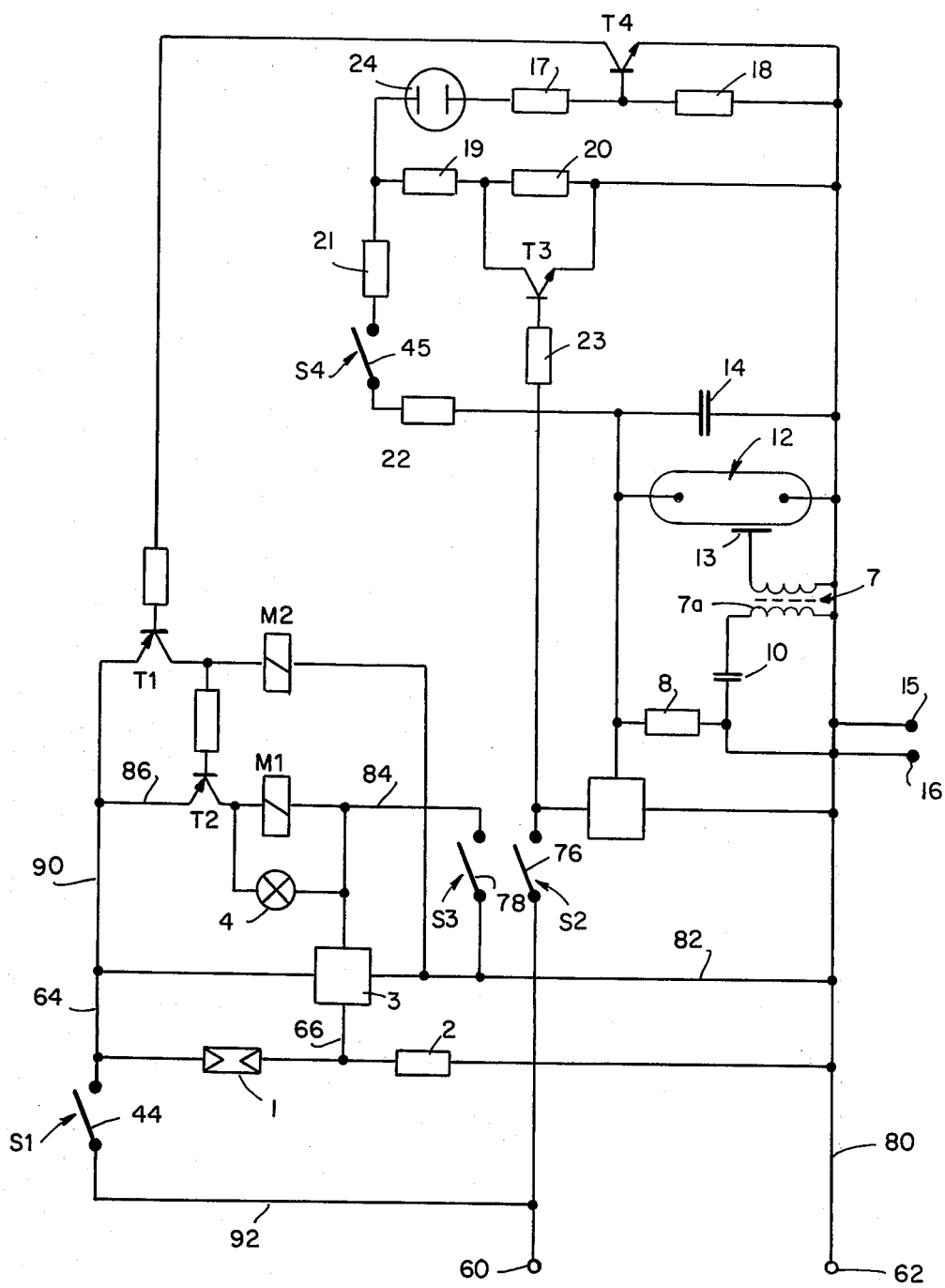
FIG. 4 is an electrical schematic diagram of the electrical circuitry employed in the embodiment of FIGS. 1-3.

Referring now to FIG. 4, the flash circuit in the embodiment of FIGS. 1-3, includes a flash lamp 12 energizable by a firing electrode 13, a high voltage transformer 7 having associated therewith a firing capacitor in series arrangement with the primary winding 7a of transformer 7, a resistor 8, and a charging capacitor 14. Also provided is a photoresistor 1 operative to detect light conditions and whose electrical resistance varies inversely with the amount of light impinging thereon; and indicator lamp 4 for indicating that ambient light conditions require use of the flash lamp 12 and a glow lamp 24 which when lit indicates that sufficient charge has accumulated on charging capacitor 14 to permit operation of flash lamp 12. The circuitry includes a pair of input terminals 60 and 62 for connection thereto of a D.C. power source such as an electrical battery (not shown).

In operation, when shutter release button 30 is manually depressed out of the position shown in FIG. 1, return pin 30a releases contact arms 44 of switches S1 and S4 allowing the same to close simultaneously. At this point, the operation of the camera system will be described for the case where the ambient light level renders the use of flash lamp 12 unnecessary. Referring to FIG. 4, photoresistor 1 and resistor 2 form a variable voltage divider the output of which is applied to a threshold circuit which may take the form of a Schmitt trigger circuit 3. Under the assumed light conditions which do not require the use of flash lamp 12, the resistance of photoresistor 1 is low and consequently the proportion of the battery voltage applied to Schmitt trigger circuit 3 is small. As a result, no current flows to either ambient light indicator lamp 4 or electromagnet M1.

Further depression of release button 30 to the intermediate position shown in FIG. 2, causes button head 30b to bear downwardly on the top wall of holder 28 causing the latter to pivot in the direction of arrow 68. As a result of such pivoting motion by holder 28, armature nose portion 27a is released from stop pin 29 causing armature 27 to pivot under the force of return spring 26 in the direction of arrow 70 whereby armature shoulder portion 27b engages pawl tooth 33a causing shutter release pawl 33 to rotate in the direction of arrow 72. Such rotation of pawl 33 causes its upper tooth position 33b to disengage from shutter tensioning level 34, permitting shutter 52 to rotate in the direction of arrow 74 and snap into the position shown in FIG. 2.

The operation of the camera system will now be described for the case where light conditions require the use of flash lamp 12 and where it is accordingly desired that shutter 54 not be released from its position of FIG. 1 until sufficient charge has been accumulated on charging capacitor 14 to permit firing of flash lamp 12.

As previously suggested, under conditions of low ambient light levels the resistance of photoresistor 1 will be high relative to the fixed resistance of resistor 2, whereby the voltage drop across photoresistor 1 which is applied to Schmitt trigger circuit 3 via leads 64 and 66 will be sufficiently high to actuate trigger circuit 3 causing currect flow both to light indicator lamp 4, causing the latter to light, and to electromagnet M1 which is in parallel with trigger 3. Such current flow through electromagnet M1 causes the latter to energize, thus attracting armature 28 into contact therewith.

When button 30 is further depressed to its lower limit position, depicted in FIG. 3, the underside of armature tooth 27c simultaneously bears downwardly against the contact arms 76 and 78 of switches S2 and S3 to close said switches while the upper hook portion of tooth 27c engages spring loaded pawl 31. Closure of switch S3 permits current flow through electromagnet M1 from battery terminal 62 through leads 80, 82, switch S3, conductive transistor T2, leads 86 and 90, closed switch S1 and lead 92 battery terminal 60. It is thus evident that such current flow through electromagnet M1 will be maintained even if light conditions cause the resistance of photoresistor 1 to drop and Schmitt trigger 3 to deactivate.

The process of charging capacitor 14 initiated by closure of switch S2 will now be described. It will be noted that resistors 17, 18, 19 and 20 form a variable voltage divider circuit in which resistor 20 is shunted when transistor T3 is conductive and is part of the voltage divider circuit when transistor T3 is non-conductive. When a predetermined level of charge is accumulated on charging capacitor 14, the voltage on capacitor 14 will cause indicator glow lamp 24 to fire thus signalling a "flash ready" condition. Transistor T4 becomes conductive in this condition thereby applying a negative potential from negative battery terminal 62 to the base of transistor T1 rendering the same conductive whereby the positive potential from battery lead 60 through switch S1, lead 90 and conductive transistor T1 renders the base of transistor T2 positive causing the latter to become non-conductive and thereby interrupting the current flow to electromagnet M1. As a result of this deenergization of electromagnet M1, armature 27 is released therefrom allowing return spring 26 to pivot armature 27 in the direction of arrow 70. Furthermore, return spring 25 pivots holder 27 in a direction opposite to that of arrow 68, i.e. upwardly, moving release button 30 upwardly to its rest position of FIG. 1 wherein armature nose portion 27a abuts limit stop pin 29.

Shortly before release button 30 reaches its upper limit rest position of FIG. 1, return pin 30a in its upward motion simultaneously opens contract arms 44 and 45 of switches S1 and S4. The opening of switch S4 removes the load imposed on capacitor 14 by the various components is eliminated thus conserving the charge on capacitor 14 and prolonging the charge level on capacitor 14 necessary for energizing flash lamp 12. The readiness for flash is indicated both by the illumination of indicator glow lamp 24 and the snap of release button 30 into its rest position of FIG. 1, thus providing both a visual and audible indication of flash readiness. When release button 30 is depressed again from its rest position of FIG. 1, and capacitor 14 is at full charge level, the downward motion of return pin 30a causes both switches S1 and S4 to close, causing transistor T1 to become conductive and thereby causing transistor T2 to become non-conductive. When transistor T2 is thus rendered non-conductive it blocks current flow to electromagnet M1 and indicator lamp 4 whereby the latter is extinguished. However, when transistor T1 is conductive it provides current flow to electromagnet M2 which energizes and thus switches the diaphragm of the camera into the proper position for a flash photograph.

The above-mentioned interruption of current to electromagnet M1 causes armature 27 to pivot in the direction of arrow 68 into the position depicted in FIG. 2 and the shutter release operation is then similar to that described above for the case when ambient light conditions are sufficient and do not require the use of a flash. When button 30 is released, synchronous contacts 15 and 16 are bypassed in the usual manner causing lamp 12 to flash.

In the event that flashing does not occur promptly after capacitor 14 is charged to the flash level, it will maintain its charge for a certain period of time in readiness for flash. Opening of switch S2 causes transistor T3 to be rendered non-conductive thereby placing resistor 20 into the above-described voltage divider circuit including resistors 17, 18 and 19. The resultant deenergization, i.e. turning OFF of glow lamp 24, occurs at a substantially lower voltage than the turn ON voltage, i.e. the voltage necessary to cause lamp 24 to ignite, thus forming an artificial hysteresis.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a photographic camera system having a shutter and a flash unit for providing momentary artificial illumination of the photographic subject, the combination comprising means adaptable for connection of said camera system to a D.C. power source, a shutter release member movable from a rest position through an intermediate position to a fully depressed position, a pivotally mounted holder member mounting an electromagnet and movable in response to said movement of said shutter release member from a rest position, through an intermediate position to a fully extended position respectively, an armature pivotally mounted on said holder member and operative to move into first and second positions into and out of contact with said electromagnet in response to the energization and deenergization of said electromagnet respectively, and latching means for latching and releasing said shutter in response to said movement of said armature into and out of conctact with said electromagnet, whereby when said holder member is in said intermediate position and said armature is in said second position said shutter is released.

2. The combination as claimed in claim 1 including means operative to produce an electrical signal in accordance with the level of ambient light at said photographic object, and means responsive to said electrical signal to selectively energize and deenergize said electromagnet and thereby selectively move said armature to said first and second positions respectively.

3. The combination as claimed in claims 1 or 2 including spring means for urging said armature into said second position thereof when said electromagnet is deenergized, and wherein said armature is locked in said first position during the period of charging said flash unit, said spring means being operative to move said armature into said second position after said flash unit charging is completed and the electrical charge of said flash unit reaches a predetermined level.

4. The combination as claimed in claim 3 wherein said armature is rendered into said second position out of contact with said electromagnet whenever said electrical charge on said flash unit is at said predetermined level.

* * * * *